(12) United States Patent
Hyde et al.

(10) Patent No.: US 6,681,649 B2
(45) Date of Patent: Jan. 27, 2004

(54) INERTIAL CONTROL AND MEASUREMENT SYSTEM

(75) Inventors: Tristram T. Hyde, Phoenix, AZ (US); Lawrence P. Davis, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/115,565

(22) Filed: Apr. 3, 2002

(65) Prior Publication Data

US 2003/0188592 A1 Oct. 9, 2003

(51) Int. Cl.$^7$ .................... G01C 19/30; B64G 1/28
(52) U.S. Cl. .................... 74/5.47; 244/165
(58) Field of Search .................... 74/5.4, 5.42, 5.46, 74/5.47, 5.6 D, 5.6 E; 244/164, 165

(56) References Cited

U.S. PATENT DOCUMENTS

| | | | | |
|---|---|---|---|---|
| 4,838,099 A | * | 6/1989 | Quermann | 74/5.47 |
| 5,367,398 A | * | 11/1994 | Ito et al. | 359/154 |
| 5,386,738 A | | 2/1995 | Havenhill | 74/5 |
| 5,754,023 A | * | 5/1998 | Roston et al. | 315/561 |
| 5,816,538 A | * | 10/1998 | Challoner et al. | 244/165 X |
| 6,039,290 A | * | 3/2000 | Wie et al. | 244/165 |
| 6,354,163 B1 | * | 3/2002 | Heiberg | 74/5.47 |

FOREIGN PATENT DOCUMENTS

| | | |
|---|---|---|
| WO | WO9414653 | 7/1994 |
| WO | WO9947419 | 9/1999 |
| WO | WO0005549 | 2/2000 |

OTHER PUBLICATIONS

Heiberg, Christopher J., "Practical Approach to Modeling Single–Gimbal Control Momentum Gyroscopes in Agile Spacecraft," AIAA Paper 2000–4545, AIAA Guidance, Navigation, and Control Conference and Exhibit, Denver, CO; Aug. 14–17, 2000, 11 pages.

* cited by examiner

Primary Examiner—Roger Pang

(57) ABSTRACT

An inertial control and measurement system is provided for applying inertial control to a vehicle and measuring angular rate of the vehicle. The system includes a control moment gyroscope having a spinning rotor, a gimbal, a gimbal support assembly attached to a spacecraft for allowing rotation of the gimbal about a gimbal axis, and a gimbal motor for rotating the gimbal about the gimbal axis to induce torque. A controller controls the gimbal motor to generate a control torque. The controller further determines an angular rate of the vehicle as a function of a determined torque and a gimbal angle acceleration.

27 Claims, 4 Drawing Sheets

INERTIAL CONTROL AND MEASUREMENT SYSTEM

BACKGROUND OF THE INVENTION

The present invention generally relates to attitude control and rate sensing of a vehicle, such as a spacecraft, and more particularly relates to a control moment gyroscope for providing inertial control torque and attitude rate sensing.

Control moment gyroscopes (CMGs) are commonly used to provide precise directional steering control torque for a variety of vehicles, such as spacecraft satellites to maneuver the spacecraft. A control moment gyroscope is mounted to the spacecraft and typically includes a motor driven rotor spun about a rotor axis, a gimbal, a gimbal torque motor to rotate the gimbal about a gimbal axis, and a control system. The rotor is supported on the gimbal and is rotated about the gimbal axis which is generally perpendicular to the rotor axis. One example of a control moment gyroscope is disclosed in U.S. Pat. No. 5,386,738, which is hereby incorporated herein by reference. The conventional control moment gyroscope is operated such that the rotor is spun about its rotor axis at a predetermined rate to generate angular momentum. In order to induce a torque on the spacecraft, the gimbal torque motor rotates the gimbal and thus the spinning rotor about the gimbal axis. Rotation of the stored angular momentum vector produces a significant output torque which is perpendicular to the rotor axis and the gimbal axis. The output torque, in turn, is transferred directly to the spacecraft. In a typical spacecraft application, an array of at least three control moment gyroscopes are often used to produce control torque in any direction.

In order to determine the amount of output torque to induce with each control moment gyroscope, the control system receives commands and sensed parameters of the spacecraft including spacecraft angular attitude rates for yaw, pitch, and roll. The sensed attitude rates are monitored to generate control signals to operate the control moment gyroscope(s) to maintain stability and dynamic control of the spacecraft. To measure the inertial spacecraft attitude rates, the spacecraft generally employs separate gyroscopic units, referred to as rate sensing gyros. Each rate sensing gyro has a rotor, gimbal, and motor assemblies or other sensing means which add additional mass, weight, and cost to the spacecraft. Also, backup rate sensing gyros are typically mounted on the spacecraft and are employed in the event of a failure of a primary rate sensing gyro. The use of additional backup rate sensing gyros further adds to the overall mass, weight, and cost. Further, in instances where the control moment gyroscope is sufficiently vibrationally isolated from the spacecraft, the rate sensing gyro and control moment gyroscope may not be co-located which made lead to potential servo control problems, particularly with very high control bandwidth attitude control systems.

Accordingly, it is therefore desirable to reduce the weight and cost for control actuation and inertial measurement on a vehicle. In particular, it is desirable to integrate functions of the control moment gyroscope and attitude rate sensing gyro to thereby minimize the weight and cost added to a satellite spacecraft and co-locate the attitude control and sensing in some cases.

SUMMARY OF THE INVENTION

In accordance with the teachings of the present invention, an inertial control and measurement system and method are provided for generating inertial control torque and measuring angular rate of a vehicle. The system employs a control moment gyroscope having a rotor adapted to be spun by a rotor motor, a gimbal, a gimbal support assembly adapted to be attached to a vehicle for allowing rotation of the gimbal about a gimbal axis, and a gimbal motor for rotating the gimbal about the gimbal axis to induce torque. The system further includes a controller for controlling the gimbal motor to generate the control torque. The controller further determines an attitude angular rate of the vehicle as a function of a determined torque and angular acceleration of the gimbal.

According to another aspect of the present invention, a control moment gyroscope is provided for applying torque to a vehicle and determining an angular attitude rate of the vehicle. The control moment gyroscope includes a rotor adapted to be rotated about a rotor axis, a gimbal supported by an assembly attached to a vehicle, and a gimbal motor for rotating the gimbal about a gimbal axis. The control moment gyroscope further includes an acceleration determining device for determining an acceleration of the gimbal about the gimbal axis, and a torque determining device for determining torque applied to the gimbal shaft. A controller controls the gimbal motor to generate a control torque, and further determines an angular rate of the vehicle as a function of the determined torque and a gimbal acceleration. Accordingly, the control moment gyroscope provides integrated inertial control and angular rate measurement.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figure 1:
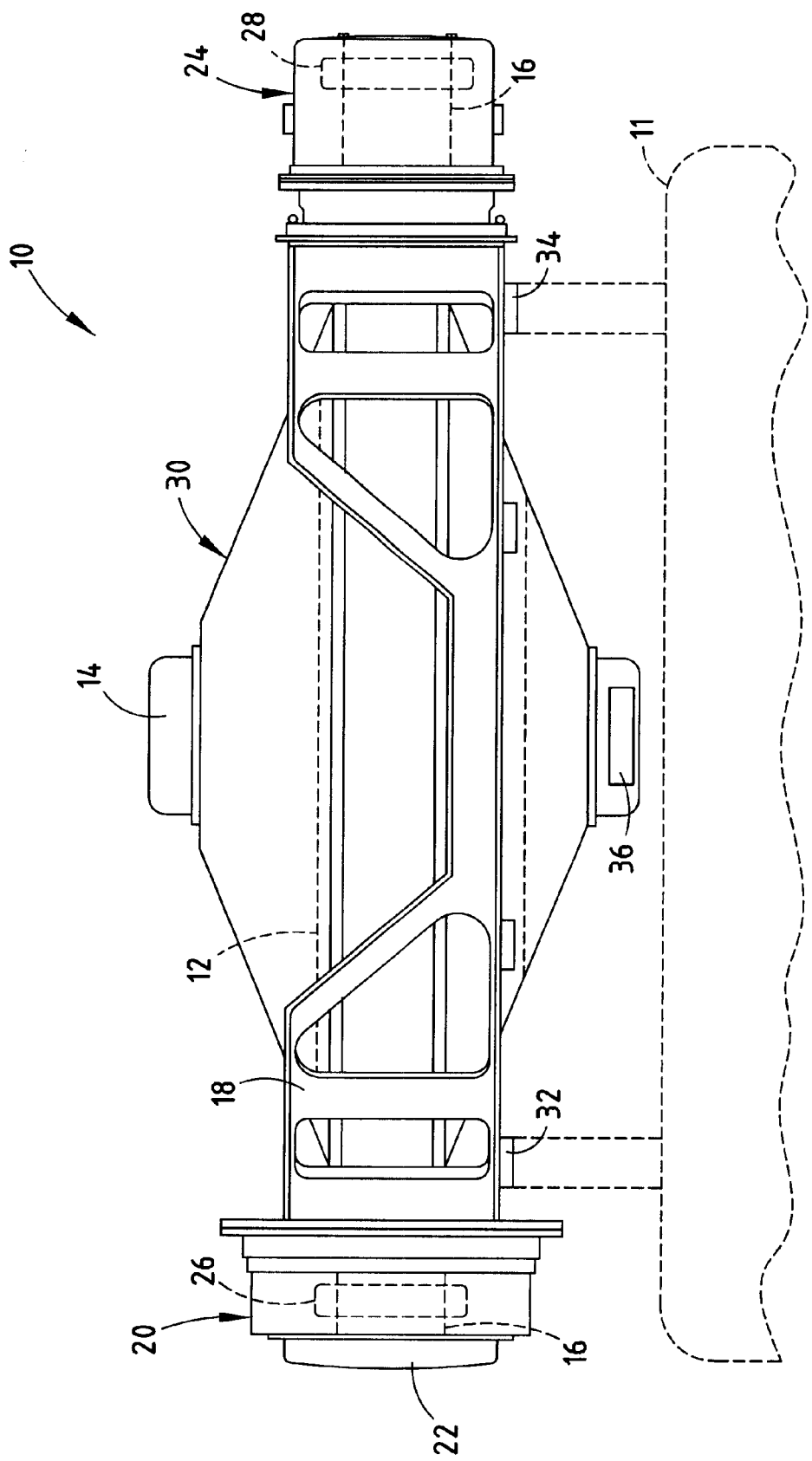
FIG. 1 is a perspective view of a control moment gyroscope used for measuring angular rate of a vehicle according to the present invention.

Referring to FIG. 1, a control moment gyroscope 10 is generally shown rigidly mounted on a spacecraft 11. The control moment gyroscope 10 provides for inertial control of the spacecraft by applying to the spacecraft 11 a controlled amount of torque for directional control of the spacecraft 11. In addition, the control moment gyroscope 10 of the present invention includes an integrated inertial measurement and control unit for measuring angular attitude rate (e.g., roll rate, pitch rate, and yaw rate) of the spacecraft 11. It should be appreciated that by integrating the angular attitude rate measurement into the control moment gyroscope 10, the present invention advantageously eliminates the need for a separate rate sensing gyro, thereby eliminating the need for separate gyroscope assemblies. While the control moment gyroscope 10 shown and described herein is a single-axis gyroscope, the control moment gyroscope 10 of the present invention may include a single-axis or multiple-axes gyroscope.

The control moment gyroscope 10 includes a spinning rotor 12 generally shown by hidden lines 12 disposed within an inner gimbal assembly 30. The rotor 12 is spun (rotated) about a rotor axis via a rotor motor 14. Rotor motor 14 spins rotor 12 about its rotor axis at a predetermined angular rate, such as 6,000 rpm, for example. Spinning of rotor 12 generates angular momentum in a vector along the rotor axis. Rotation of the spinning rotor about a gimbal axis and produces a significant output torque perpendicular to the rotor axis and gimbal axis, which is used to control the spacecraft. Attached to one end of the inner gimbal assembly 30 is a torque motor assembly 20 which generally includes a gimbal motor 22 for rotating the inner gimbal assembly 30 about a gimbal shaft 16. A gimbal rate sensor 26 is shown positioned in the torque motor assembly 20. The gimbal rate sensor 26 may include a tachometer that senses angular rate of rotation of the gimbal shaft 16. Opposite the torque motor assembly 20 is a sensor module assembly 24 which includes a gimbal angle sensor 28. The gimbal angle sensor 28, which may include any of a resolver, encoder, and a potentiometer, senses angular position of the gimbal shaft 16. Rate sensor 26 and angle sensor 28 may include conventional sensors located anywhere at or near the gimbal shaft 16.

The control moment gyroscope 10 further includes a base ring assembly 18 which connects the torque motor assembly 20 and the sensor module assembly 24 to the spacecraft 11 via rigid connectors 32 and 34. It should be appreciated that the control moment gyroscope 10 may be attached at various locations on the spacecraft 11 and is oriented according to the direction of the output torque that is desired.

According to one embodiment of the present invention, the control moment gyroscope 10 employs at least one torque sensor 36 for sensing torque in the load path between the support for the rotor 12 and the spacecraft 11. The torque sensor 36 may be mounted on the control moment gyroscope 10 at various locations in the load path to sense torque on the gimbal shaft 16. The torque sensor 36 may include a load cell or a strain gauge, according to two examples. According to an alternate embodiment of the present invention, the control moment gyroscope 10 may be configured to determine an expected gimbal shaft torque based on gimbal motor current and an estimate of gimbal friction, thus eliminating the need for a torque sensor.

Figure 2:
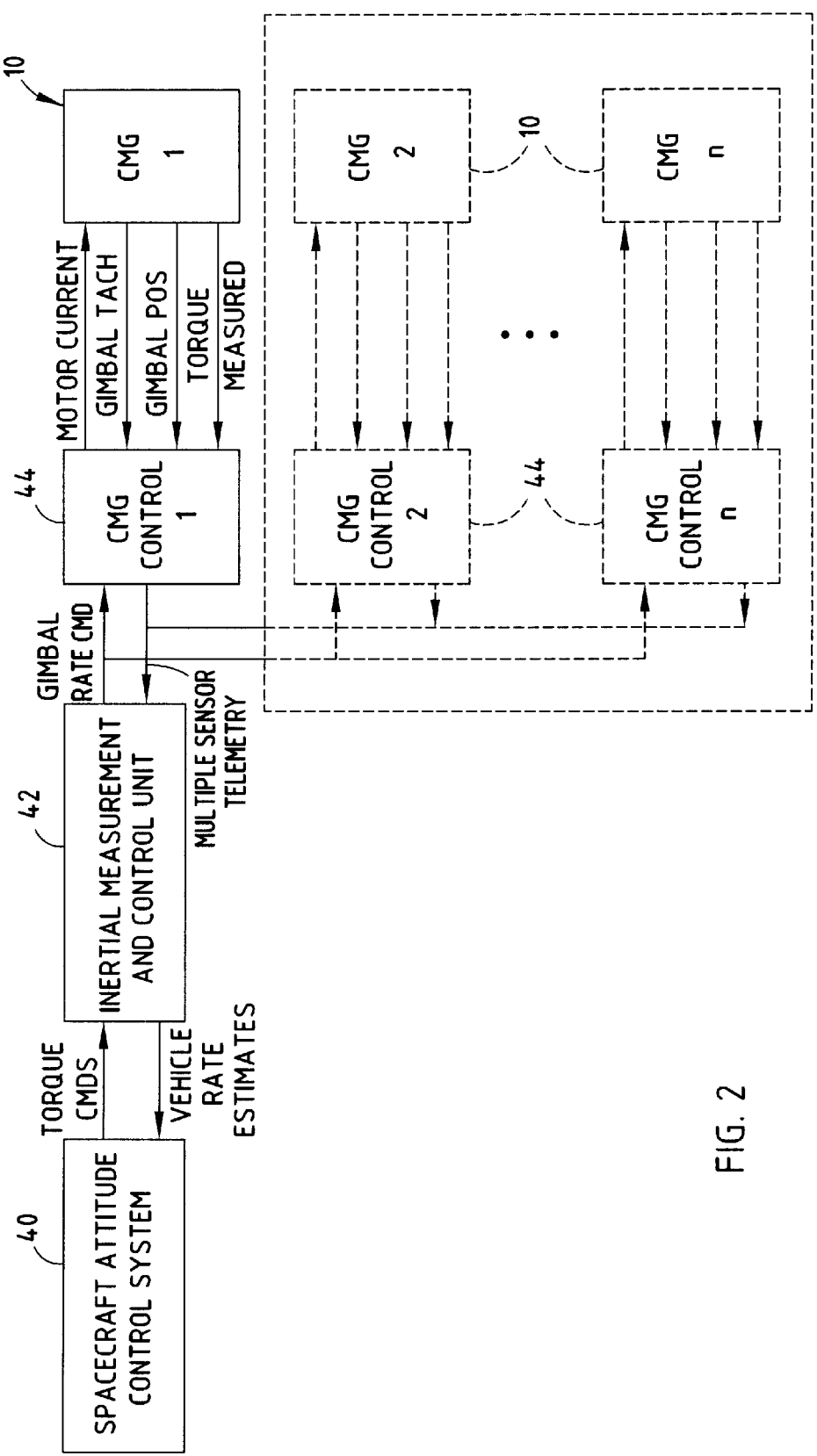
FIG. 2 is a block diagram illustrating an inertial measurement and control unit for measuring inertial movement of the vehicle with a plurality of control moment gyroscopes.

A control system for controlling one or more control moment gyroscopes 10 to control the output torque and measure angular attitude rate is illustrated in FIG. 2. The control system includes a spacecraft attitude control system 40 communicating with an inertial measurement and control unit 42. The spacecraft attitude control system 40 may include a control system integrated in the control moment gyroscope 10 or an off-board control system located elsewhere on the spacecraft. The inertial measurement and control unit 42 may be integrated within the control moment gyroscope 10 or may be located remote from the control moment gyroscope 10. The inertial measurement and control unit 42 monitors parameters sensed by the control moment gyroscope 10 and computes an angular attitude rate measurement of the spacecraft. Thus, the control moment gyroscope 10 provides torque actuation to the spacecraft, while, at the same time, the inertial measurement and control unit 42 monitors sensors on the control moment gyroscope 10 and provides an angular rate measurement without requiring one or more separate rate sensing gyros.

It should be appreciated that the inertial measurement and control unit 42 may sense parameters from each of a plurality of control moment gyroscopes 10. The sensed information may be communicated via a separate control moment gyroscope control system 44 which is located on-board the control moment gyroscope 10. While control system 44 and inertial measurement and control unit 42 are shown separate from one another, it should be appreciated that the inertial measurement and control unit 42 may be integrated into a control moment gyroscope control system 44. The control moment gyroscope control system 44 includes processing capability to generate the motor current for controlling the gimbal motor, and receives sensed signals from the gimbal tachometer 26, gimbal position sensor 28, and torque sensor 36 on-board the control moment gyroscope 10. The inertial measurement and control unit 42 processes the sensed signals and computes vehicle angular attitude rate estimates as described herein which, in turn, may be passed on to the spacecraft altitude control system 40 and used to control the spacecraft.

Figure 3:
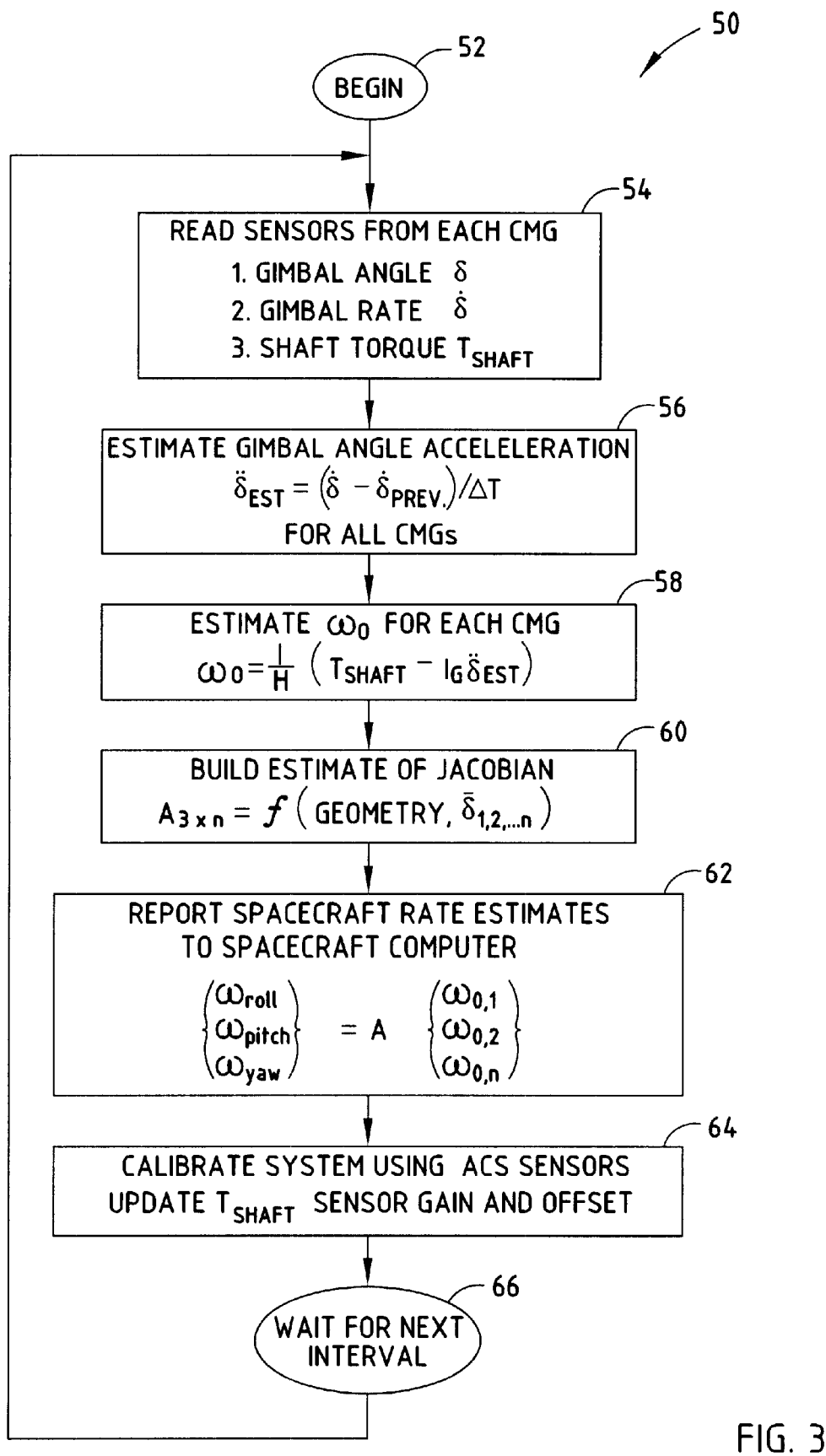
FIG. 3 is a flow diagram illustrating a routine for determining angular attitude rate of a spacecraft using a sensed torque signal according to one embodiment of the present invention.

Referring to FIG. 3, an inertial measurement routine 50 is shown for measuring the angular attitude rate of the spacecraft according to one embodiment of the present invention. The measurement routine 50 is processed by the inertial measurement and control unit 42, which may be integrated on or off the control moment gyroscope. Measurement routine 50 begins at step 52 and proceeds to step 54 to read sensed signals from sensors associated with each of the control moment gyroscopes. In particular, the sensed signals include the following: gimbal angle $\delta$; gimbal rate $\dot{\delta}$; and shaft torque $T_{SHAFT}$. The gimbal angle $\delta$ is sensed by the gimbal angle sensor 28. The gimbal rate $\dot{\delta}$ is sensed by the gimbal rate sensor 26. The shaft torque $T_{SHAFT}$ is sensed by the torque sensor 34.

Once the sensed signals are read, measurement routine 50 proceeds to step 56 to estimate the gimbal angle acceleration for each of the control moment gyroscopes. The gimbal angle acceleration $\ddot{\delta}_{EST}$ may be estimated by computing the derivative of the gimbal rate $\dot{\delta}$ as shown by the equation: $\ddot{\delta}$–$\dot{\delta}_{PREVIOUS}/\Delta T$, where $\dot{\delta}_{PREVIOUS}$ is the sensed gimbal rate taken at the previous sampling time, and $\Delta T$ is the change in sampling time. Next, in step 58, measurement routine 50 estimates the vehicle rate in the gyroscopically sensitive axis perpendicular to the rotor and gimbal axes $\omega_0$ for each of the control moment gyroscopes. The vehicle angular attitude rate estimate $\omega_0$ is computed as a function of the difference in the product of moment of moment of inertia of the gimballed hardware $I_G$ about the gimbal axis and estimated gimbal acceleration $\ddot{\delta}$ subtracted from the sensed shaft torque $T_{SHAFT}$, with the difference further divided by the angular momentum H. The moment of inertia $I_G$ about the gimbal may be calculated or measured using known techniques. The angular momentum H is computed based on the rotor moment of inertia and rotor spin rate.

Accordingly, the measurement routine 50 determines an estimated vehicle angular rate $\omega_0$ for each of the control moment gyroscopes as a function of the sensed torque and estimated gimbal angle acceleration. The estimated vehicle angular rate $\omega_0$ for each of the control moment gyroscopes may then be processed together such as shown in step 62 using an estimate of a Jacobian A, which is created in step 60 to provide a matrix relating the n gyroscopically sensed directions to the three spacecraft directions (roll, pitch, and yaw). In step 62, measurement routine 50 reports the spacecraft angular attitude rate estimates to the spacecraft computer attitude control system for each of angular roll, pitch, and yaw rates. In step 64, measurement routine 50 calibrates the spacecraft attitude control system using various attitude control system sensors and update the torque shaft $T_{SHAFT}$ sensor, gain, and offset. Step 64, calibration, may be done initially and periodically. Finally, the measurement routine 50 waits for the next interval in step 66 before returning back to step 54.

Figure 4:
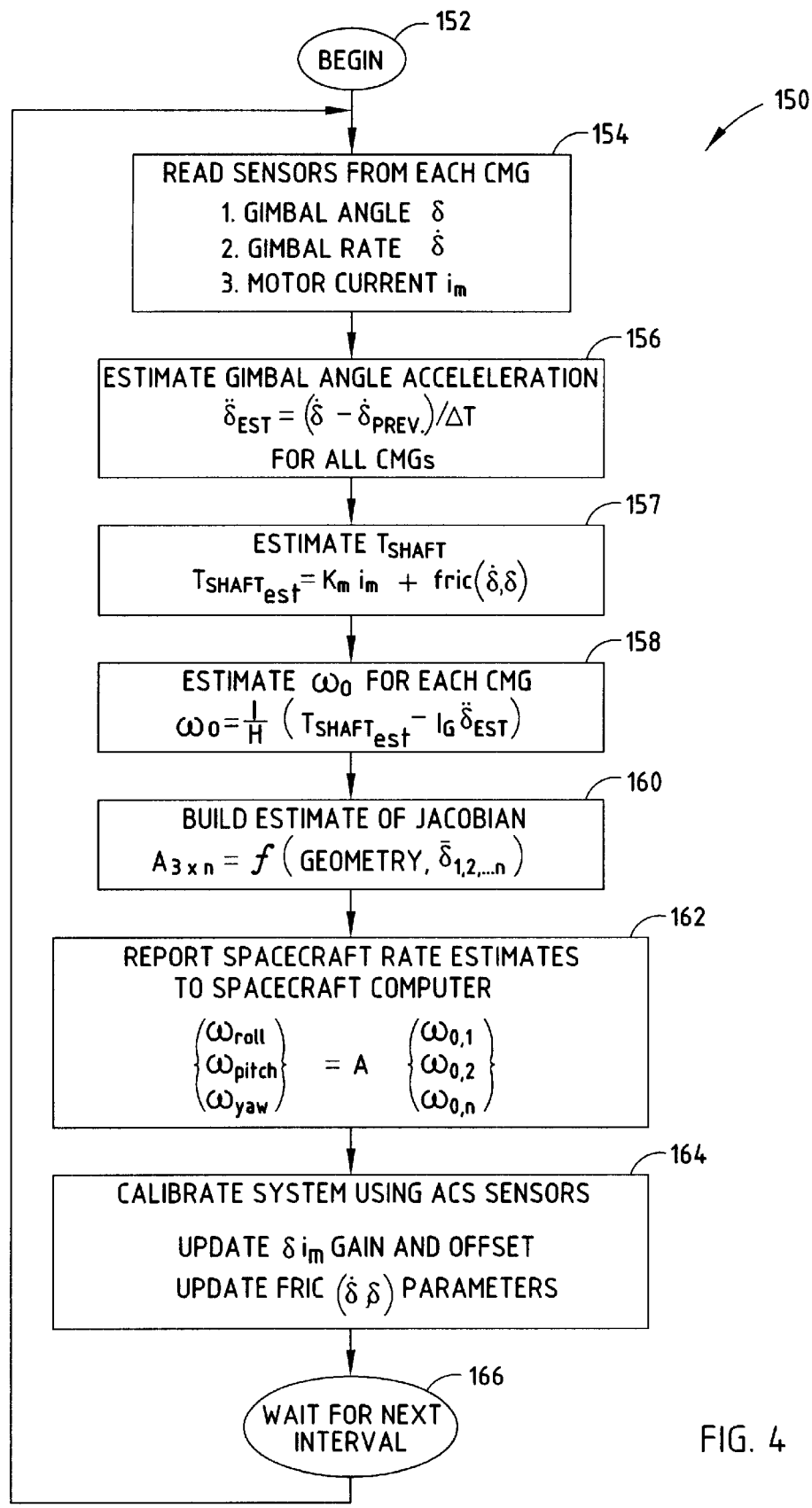
FIG. 4 is a flow diagram illustrating a routine for determining angular attitude rate of a spacecraft by estimating torque with gimbal motor current according to another embodiment of the present invention.

Referring to FIG. 4, an inertial measurement routine 150 is illustrated according to a second embodiment of the present invention for determining the angular attitude rate of the spacecraft by monitoring motor current to the gimbal motor, instead of using the torque sensor as discussed above. Measurement routine 150 begins at step 152 and proceeds to read sensed signals from the sensors associated with each of the control moment gyroscopes. The sensed signals include the following: gimbal angle $\delta$; gimbal rate $\dot{\delta}$; and gimbal motor current $i_m$. Measurement routine 150 then proceeds to step 156 to estimate the gimbal angle acceleration $\ddot{\delta}$ by computing the derivative of the sensed gimbal rate $\dot{\delta}$, as described above in step 56 of measurement routine 50. Next, in step 157, measurement routine 150 estimates the gimbal torque shaft $T_{SHAFT}$ as a function of the product of sensed gimbal motor current $i_m$ and a motor constant $K_m$ summed with a friction variable fric($\dot{\delta}$, $\delta$). The friction variable fric($\dot{\delta}$, $\delta$) compensates for known friction of the gimbal shaft 16 which may include coulomb friction and shaft viscous drag, both of which may be approximated from a lookup table based on known characteristics of the control moment gyroscope and sensed values of gimbal angular rate and/or gimbal angular position. The motor constant $K_m$ is a predetermined value that can be determined based on known characteristics of the gimbal motor. Accordingly, the gimbal shaft torque $T_{SHAFT}$ is estimated based on the gimbal motor current $i_m$, without requiring the addition of a torque sensor.

The vehicle angular rate $\omega_0$, for each of the control moment gyroscopes is then estimated in step 158, using the estimated torque $T_{SHAFT_{est}}$ in place of the sensed torque, as described above in connection with step 58 of routine 50. Thereafter, measurement routine 150 similarly proceeds to step 160 to build an estimate of Jacobian, and then to step 162 to report spacecraft rate estimates to the spacecraft computer attitude control system, similar to steps 58–62 described above. In step 164, measurement routine 150 calibrates the attitude control system using various sensors and updates various parameters, and then proceeds to step 166 to wait for the next interval.

Accordingly, a control moment gyroscope 10 is provided for controlling a vehicle, such as a spacecraft, by applying torque to control the vehicle, while at the same time measuring angular attitude rate information about the vehicle. By integrating the functions of torque control and angular attitude rate measurement into the control moment gyroscope 10, the need for separate rate sensing gyros can be eliminated. It should be appreciated that the control moment gyroscope 10 of the present invention achieves reduced components, costs, and weight for inertial control and measurement on a vehicle which is particularly advantageous for use on spacecraft vehicles.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A control moment gyroscope for applying torque to a vehicle and determining angular rate of the vehicle, said control moment gyroscope comprising:

a rotor adapted to be spun about a rotor axis;

a gimbal supported by an assembly attached to a vehicle, wherein the gimbal is rotatable about a gimbal axis;

a gimbal motor for rotating the gimbal about the gimbal axis;

a gimbal acceleration determining device for determining angular acceleration of the gimbal about the gimbal axis;

a torque determining device for determining torque applied to the gimbal; and a controller for controlling the gimbal motor to generate a control torque, said controller further determining an angular rate of the vehicle as a function of the determined torque and the angular acceleration of the gimbal.

2. The control moment gyroscope as defined in claim 1, wherein the angular rate of the vehicle is further determined as a function of angular momentum of the rotor and moment of inertia of the gimbal about the gimbal axis.

3. The control moment gyroscope as defined in claim 2, wherein the angular rate of the vehicle is determined as a function of the difference in determined shaft torque and the product of moment of inertia of the gimbal about the gimbal axis and gimbal angular acceleration, wherein the difference is divided by the angular momentum.

4. The control moment gyroscope as defined in claim 1, wherein the gimbal acceleration determining device comprises a gimbal rate sensor for sensing gimbal rate of rotation about the gimbal axis, wherein the acceleration is determined as a derivative of said sensed gimbal rate.

5. The control moment gyroscope as defined in claim 1 further comprising a gimbal angle sensor for sensing an angular position of the gimbal.

6. The control moment gyroscope as defined in claim 1, wherein the torque determining device comprises a torque sensor.

7. The control moment gyroscope as defined in claim 1, wherein the torque determining A device comprises a motor current sensor, wherein the determined torque is estimated as a function of the product of the sensed motor current and a motor constant.

8. The control moment gyroscope as defined in claim 7, wherein the determined torque is further estimated as a function of gimbal friction.

9. The control moment gyroscope as defined in claim 1, wherein the vehicle comprises a spacecraft.

10. An inertial control and measurement system for controlling inertial control torque and measuring angular rate, said system comprising:

a control moment gyroscope comprising a rotor adapted to be rotated by a rotor motor, a gimbal, a gimbal support assembly adapted to be attached to a vehicle for allowing rotation of the gimbal about a gimbal axis, and a gimbal motor for rotating the gimbal about the gimbal axis to generate an inertial control torque; and a controller for controlling the gimbal motor to generate the inertial control torque, said controller further determining an angular rate of the vehicle as a function of a determined torque applied to the gimbal and a gimbal angular acceleration.

11. The system as defined in claim 10, wherein the angular rate is further determined as a function of angular momentum of the rotor and moment of inertia of the gimbal about the gimbal axis.

12. The system as defined in claim 11, wherein the angular rate of the vehicle is determined as a function of the difference in determined torque and the product of moment of inertia of the gimbal about the gimbal axis and gimbal angular acceleration, wherein the difference is divided by the angular momentum.

13. The system as defined in claim 10 further comprising a gimbal rate sensor for sensing gimbal rate of rotation about the gimbal axis, wherein the gimbal acceleration is determined as a derivative of said sensed gimbal rate.

14. The system as defined in claim 10 further comprising a gimbal angle sensor for sensing an angular position of the gimbal.

15. The system as defined in claim 10 further comprising a torque sensor for sensing the determined torque.

16. The system as defined in claim 10, wherein the determined torque is estimated as a function of the product of gimbal motor current and a motor constant.

17. The system as defined in claim 16, wherein the determined torque is further estimated as a function of gimbal friction.

18. The system as defined in claim 1, wherein the system is attached to a spacecraft for applying inertial control torque to the spacecraft and determining angular rate of movement of the spacecraft.

19. A method of controlling a control moment gyroscope having a rotor adapted to be rotated by a rotor motor, a gimbal, a gimbal support assembly adapted to be attached to a vehicle for allowing rotation of the gimbal about a gimbal axis, and a gimbal motor for rotating the gimbal about the gimbal axis to generate an inertial control torque, said method comprising the steps of:

applying current to the gimbal motor to generate an inertial control torque;

determining acceleration of the gimbal about the gimbal axis;

determining torque present on the gimbal; and determining an angular rate of the vehicle as a function of the determined torque and the gimbal acceleration.

20. The method as defined in claim 19 further comprising the step of determining angular momentum of the rotor and moment of inertia of the gimbal about the gimbal axis, wherein the step of determining the angular rate determines the angular rate further as a function of the angular momentum and inertia.

21. The method as defined in claim 20, wherein the step of determining angular rate comprises the steps of:

computing the product of the moment of inertia of the gimbal about the gimbal axis and the determined acceleration;

computing the difference in the product of inertia and determined acceleration and the determined torque; and dividing the difference by the angular momentum of the rotor.

22. The method as defined in claim 19, wherein the step of determining acceleration comprises the steps of:

sensing gimbal rate of rotation about the gimbal axis; and computing a derivative of the sensed gimbal rate to determine the determined acceleration.

23. The method as defined in claim 19 further comprising the step of sensing angular position of the gimbal.

24. The method as defined in claim 19, wherein the step of determining torque comprises sensing torque with a torque sensor.

25. The method as defined in claim 19, wherein the step of determining torque comprises estimating torque as a function of gimbal motor current.

26. The method as defined in claim 25, wherein the step of determining torque further comprises estimating torque as a function of gimbal friction.

27. The method as defined in claim 19 further comprising the step of mounting the control moment gyroscope on a spacecraft for applying control torque to the spacecraft and measuring angular rate of the spacecraft.

\* \* \* \* \*